United States Patent Office 2,909,522
Patented Oct. 20, 1959

2,909,522
TRIALKOXYBENZYLPYRIMIDINES AND METHOD

George H. Hitchings, Yonkers, and Barbara Roth, Scarsdale, N.Y., assignors to Burroughs Wellcome & Co. (U.S.A.) Inc., Tuckahoe, N.Y., a corporation of New York No Drawing. Application February 14, 1958
Serial No. 715,183

Claims priority, application Great Britain
February 21, 1957

4 Claims. (Cl. 260—256.4)

The present invention relates to pyrimidine derivatives and the preparation thereof. Particularly it deals with a new group of 5-benzyl-2,4-diaminopyrimidines which have valuable properties in the treatment of bacterial and protozoal diseases. This new group of substances is superior to the group of 5-benzyl-2,4-diaminopyrimidines previously described (British patent specification No. 734,801) in having substantially greater activity against microorganisms while at the same time exhibiting fewer side effects.

Thus mice were infected with *Proteus vulgaris* intraperitoneally and were treated orally with the dimethoxybenzyl and the trimethoxybenzyl-2,4-diaminopyrimidines in the same experiment, 3 dose of 5 mg. each being given orally, one immediately after infection, one six hours later and one on the following day. All untreated mice and all those treated with 5-(3',4'-dimethoxybenzyl)-2,4-diaminopyrimidine died in less than 24 hours while the average survival of those treated with the compound of Example 1 below was 3.16 days. Similarly, when the treatment was 0.5 mg. of pyrimidine plus 1.0 mg. of sulfadiazine, the average survival was 6 days with the trimethoxy derivative and less than 1 day with the dimethoxy derivative. The subject compounds have high antibacterial activity in vitro, the minimum inhibitory concentration of the trimethoxy derivative being in $\mu$g./ml. (p.p.m.) being 0.125 for *Staphylococcus aureus*, >0.06 for *Salmonella typhosa*, 0.2 for *Proteus vulgaris* and 2.0 for *Streptococcus pyogenes*. It is equally effective against penicillin-resistant strains of staphlococcus. The compounds markedly potentiate the sulfonamides as illustrated in the experiment cited above. A number of uses for these agents both in vitro and in vivo, both alone and in combination with sulfonamides will be apparent to those skilled in the art. A preparation containing 1 percent of the compound of Example I and 5000 units per ml. of polymyxin has been found a highly effective topical antibacterial agent; the two drugs complement one another to give a broad range of bacterial control.

The new substances may be designated by the following formula wherein $R^1$, $R^2$, and $R^3$ are lower alkyl groups, preferably having from 1 to 4 carbon atoms.

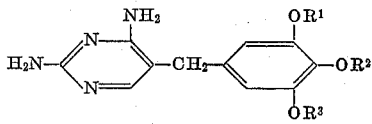

The compounds may be prepared substantially by the method described in British patent specification 687,032. It consists in the formylation of an hydrocinnamic ester of formula

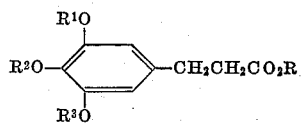

wherein $R^1$, $R^2$ and $R^3$ have the above meanings and R is a lower alkyl radical. The formyl derivative is condensed with guanidine, and the resultant 2-amino-4-hydroxy-5-benzylpyrimidine is chlorinated and aminated, as previously described, to give the 2,4-diamino derivative.

The invention will now be illustrated with reference to the following example in which all temperatures are given in degrees centigrade.

EXAMPLE I

Ethyl-3,4,5-trimethoxycinnamate

One hundred and ten grams of 3,4,5-trimethoxycinnamic acid was placed in a 3 litre round-bottomed flask with 2 litres of absolute ethanol and 15 ml. of concentrated sulphuric acid and the solution was heated at reflux temperature on a steam bath overnight. The bulk of ethanol was evaporated and the residue poured into about 1500 ml. of water. The white precipitate was collected, washed very well with water (4500 ml.) and dried in vacuo. There was obtained 123 grams of compound of melting point 64°. Recrystallization from 95% ethanol raised the melting point to 70°.

Ethyl-3,4,5-trimethoxyhydrocinnamate

Forty-one grams of ethyl-3,4,5-trimethoxycinnamate was dissolved in 300 ml. of ethanol and approximately 12–15 g. of Raney nickel in ethanol added, and the mixture was shaken in an atmosphere of hydrogen at 40 lbs. pressure. After the hydrogen uptake ceased, the mixture was filtered and washed very well with absolute ethanol, the ethanol was removed in vacuo, benzene added twice and evaporated to remove any water present. The product was distilled off, giving 114.8 g. of compound. The fraction boiling at 149–153°/0.5 mm. was collected. Boiling point 148°/0.5 mm.

2 - amino - 4 - hydroxy - 5 - (3',4',5' - trimethoxybenzyl) pyrimidine

Into a 2 litre, 3 neck round-bottomed flask equipped with a magnetic stirrer, condenser and drying tube, and a dropping funnel and heating mantle was placed about 500 ml. of sodium-dry anhydrous ether. There was added with stirring, 36.95 g. of 20% sodium dispersed in naphthalene (0.321 mole) and the mixture was stirred until all the naphthalene was dissolved. A mixture of 57.4 g. of ethyl-3,4,5-trimethoxyhydrocinnamate (0.214 mole), 31.7 g. of ethyl formate (0.428 mole, 34.4 ml.) and about 50 ml. of sodium dry anhydrous ether was prepared, and a few ml. added to the sodium dispersion in ether.

The initiation of the reaction could be observed by the liberation of heat which caused the ether to begin to boil. The ester mixture was then added at such a rate that gentle boiling was continuous (1 hr.). Stirring was continued overnight.

The resultant formyl derivative was condensed with guanidine without attempting isolation. To the formylation mixture was added a filtered solution of guanidine prepared from 30.6 g. of guanidine hydrochloride in 225 ml. of ethanol, and sodium ethoxide prepared from 7.38 g. of sodium in 250 ml. of absolute ethanol. The ether was boiled off and the alcoholic ester-guanidine solution was heated at reflux temperature for 4 hours.

The alcohol was evaporated in vacuo to a thick paste which was then poured into 2500 ml. of water. The naphthalene was extracted with ether and the aqueous portion was then neutralized by the addition of acetic acid and then the pH value of the solution was adjusted to 8 by the addition of ammonium hydroxide. After standing for several hours, the mixture was filtered, washed with water, alcohol and ether and dried at 105°. After recrystallization from 50% ethanol, the melting point was 257–258°.

2,4-diamino-5-(3',4',5'-trimethoxybenzyl)pyrimidine

Thirty grams of the above amino-hydroxy compound were suspended in 320 ml. of phosphoryl chloride and the mixture was refluxed until the solid was dissolved and then for an additional 3 hours (4 hrs. total). After cooling, the excess phosphoryl chloride was removed in vacuo and the resultant syrup was poured over 500 g. of cracked ice and small portions of ammonium hydroxide were added from time to time to maintain a neutral or slightly alkaline reaction. The product, consisting of 2-amino-4-chloro-5-(3',4',5'-trimethoxybenzyl) pyrimidine, was collected by centrifugation and then suspended in 650 ml. of ethanolic ammonia (saturated at 0°).

This mixture was heated at 175° for approximately 3 hours in a sealed system. After cooling, the mixture was evaporated to dryness on the steam bath; the residue was suspended in 700 ml. of water and acidified by the addition of 20 ml. of glacial acetic acid. The solution was heated to boiling, treated with carbon and filtered. When the filtrate had cooled to approximately room temperature, the solution was made strongly alkaline by the addition of concentrated sodium hydroxide solution. The resultant precipitate of the diamino derivative was collected after 2 hours and washed with water. After recrystallization from water, it melted at 199°. Ultraviolet absorption spectra: pH 1, $\lambda$ max.=270$\mu$, $E_m$=5900. pH 11, $\lambda$ max.=287$\mu$, $E_m$=7750.

EXAMPLE II

2,4-diamino-5-(3',5'-dimethoxy-4'-butoxybenzyl)pyrimidine

Fifty-six grams of syringic aldehyde was converted to the potassium salt and refluxed 16 hours with 74 g. of n-butyliodide in 150 ml. of absolute alcohol. There was produced 3,5-dimethoxy-4-n-butoxybenzaldehyde, melting at 48.5–49° C. This was converted to 3,5-dimethoxy-4-n-butoxycinnamic acid (M.P. 75.5–76°) by treatment with two equivalents of malonic acid in refluxing pyridine. The ethyl ester (B.P. 192–194°/1.0 mm.) was prepared by refluxing in absolute alcohol with sulfuric acid catalyst. This was reduced catalytically with Raney nickel in alcohol to the hydrocinnamic ester, B.P. 153°/0.5 mm.

To a suspension of sodium in 500 ml. absolute ether, prepared from 22.3 g. of 20% sodium dispersed in naphthalene was added dropwise a mixture of 40 g. ethyl 3,5-dimethoxy-4-n-butoxyhydrocinnamate, 19 g. of ethyl formate, and 50 cc. dry ether. The mixture was stirred overnight, followed by the addition of a solution of guanidine in absolute alcohol which was made by dissolving 4.45 g. sodium in 500 ml. absolute alcohol, adding 18.65 g. of guanidine hydrochloride, and filtering from salt. The ether was removed from the mixture, followed by refluxing 4 hours. The alcohol was then removed, the naphthalene extracted with ether, and the product obtained by neutralizing a dilute acetic acid solution of the product. There was obtained 2-amino-4-hydroxy-5-(3',5'-dimethoxy-4-n-butoxybenzyl) pyrimidine, melting at 255°. Nine grams of the above pyrimidine was refluxed with 50 ml. of phosphorus oxychloride until all was in solution, followed by removal of excess phosphorus oxychloride. The residue was poured over ice, neutralized, and treated then in an autoclave with 500 ml. of saturated alcoholic ammonia, for 2.5 hours at 178°. The product was isolated by removal of the solvent, followed by dissolving the residue in aqueous acid and rendering alkaline with sodium hydroxide. The product precipitated from the alkaline solution. Upon recrystallization from water, there was obtained pure 2,4-diamino-5-(3',5'-dimethoxy-4'-n-butoxybenzyl)pyrimidine, melting at 163–164°.

EXAMPLE III

2,4-diamino-5-(2'-bromo-3',4',5'-trimethoxybenzyl)-pyrimidine (NA–266)

One gram (0.0035 mole) of 2,4-diamino-5-(3',4',5'-trimethoxybenzyl)-pyrimidine was dissolved in 15 ml. of glacial acetic acid. To this was added dropwise at room temperature a solution of 0.18 ml. (0.0035 mole) bromine in 10 ml. of glacial acetic acid. The bromine was rapidly decolorized, and a white precipitate began to form shortly after the addition had been started. The mixture was allowed to stand for one hour at room temperature after the addition was complete, filtered, and the precipitate washed well with acetic acid and then ether. After air drying, the product was slurried in water and the mixture rendered alkaline with sodium hydroxide. A gum separated which soon solidified to a white crystalline solid. The product was isolated and recrystallized from dilute alcohol. There was obtained 0.83 g. of 2,4-diamino-5-(2'-bromo-3',4',5'-trimethoxybenzyl) - pyrimidine, melting at 192–193°.

What we claim is:

1. A compound of the formula

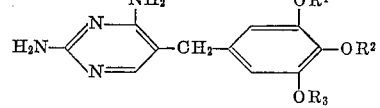

wherein $R^1$, $R^2$ and $R^3$ are lower alkyl groups.

2. 2,4-diamino-5-(3',4',5'-trimethoxybenzyl) pyrimidine.

3. 2,4 - diamino-5-(3',5'-dimethoxy-4'-butoxybenzyl) pyrimidine.

4. 2,4-diamino-5-(2'-bromo-3',4',5'-trimethoxybenzyl)-pyrimidine.

References Cited in the file of this patent

UNITED STATES PATENTS 2,658,897    Hitchings et al. _____ Nov. 10, 1953

FOREIGN PATENTS 734,801    Great Britain _____ Mar. 6, 1953